(12) United States Patent
Murakami et al.

(10) Patent No.: US 7,957,170 B2
(45) Date of Patent: Jun. 7, 2011

(54) COOLING-FIN MOUNTED RECTIFIER FOR VEHICULAR AC GENERATORS

(75) Inventors: Harumi Murakami, Nagoya (JP); Koji Kondo, Kiyosu (JP)

(73) Assignee: Denso Corporation, Kariya (JP)

( * ) Notice: Subject to any disclaimer, the term of this patent is extended or adjusted under 35 U.S.C. 154(b) by 347 days.

(21) Appl. No.: 12/213,517

(22) Filed: Jun. 20, 2008

(65) Prior Publication Data

US 2008/0316786 A1    Dec. 25, 2008

(30) Foreign Application Priority Data

Jun. 21, 2007  (JP) ................. 2007-164294
Dec. 5, 2007   (JP) ................. 2007-314150

(51) Int. Cl.
*H02M 1/10*    (2006.01)
(52) U.S. Cl. ..................... 363/141; 310/68 D
(58) Field of Classification Search .............. 363/52, 363/55, 58, 64, 65, 141–146; 310/62, 85, 310/45, 239, 242, 68 D, 208, 68 B–68 C, 310/184; 361/704, 709, 720
See application file for complete search history.

(56) References Cited

U.S. PATENT DOCUMENTS

| | | | |
|---|---|---|---|
| 4,841,182 A * | 6/1989 | Tsuchiya et al. | ............ 310/68 D |
| 6,034,452 A | 3/2000 | Nakamura et al. | |
| 6,617,723 B1 | 9/2003 | Shichijyo | |
| 6,800,974 B2 | 10/2004 | Shichijyo | |
| 2004/0051409 A1 | 3/2004 | Nakamura et al. | |
| 2004/0183385 A1 | 9/2004 | Takahashi et al. | |

FOREIGN PATENT DOCUMENTS

| | | |
|---|---|---|
| JP | A-54-15133 | 2/1979 |
| JP | B2-3374776 | 2/2003 |
| JP | A-2004-80916 | 3/2004 |
| JP | A-2004-112860 | 4/2004 |
| JP | A-2004-282905 | 10/2004 |
| JP | B2-3820712 | 9/2006 |

OTHER PUBLICATIONS

English language version of Office Action issued in corresponding Japanese Patent Application No. 2007-314150.

* cited by examiner

*Primary Examiner* — Rajnikant B Patel
(74) *Attorney, Agent, or Firm* — Oliff & Berridge, PLC

(57) ABSTRACT

A rectifier for an alternating current generator is provided. The rectifier comprise a plurality of high-side rectifying elements and a plurality of low-side rectifying elements. The high-side rectifying elements are held by a plurality of high-side cooling fins, while the high-side rectifying elements are held by a plurality of low-side cooling fins. By way of example, the plurality of high-side cooling fins are disposed to be apart from each other by a predetermined distance and the plurality of low-side cooling fins are disposed to be apart from each other by a predetermined distance.

20 Claims, 7 Drawing Sheets

COOLING-FIN MOUNTED RECTIFIER FOR VEHICULAR AC GENERATORS

CROSS REFERENCES TO RELATED APPLICATIONS

The present application relates to and incorporates by reference Japanese Patent Application Nos. 2007-164294 filed on Jun. 21, 2007 and 2007-314150 filed on Dec. 5, 2007.

BACKGROUND OF THE INVENTION

1. Field of the Invention

The present Invention relates to a rectifier used in a vehicular alternating current (AC) generator (i.e., alternator) mounted in vehicles such as automobiles and tracks, and in particular, to the rectifier provided with cooling fins (or radiating fins).

2. Description of the Related Art

In general, most vehicles are provided with an alternating current generator, i.e., alternator. The known vehicular AC generator employs one high-side (i.e., positive-side) cooling fin and one low-side (i.e., negative-side) cooling fin and these fins are arranged so as to be overlapped in the direction along the rotary shaft of the generator, as disclosed by Japanese Patent Nos. 3820712 and 3374776.

However, in the above conventional cooling-fin structure provided with the one high-side cooling fin and the one low-side cooling fin, it is difficult to enlarge their heat dissipation areas. Thus the dissipation areas cannot be made larger, thereby being difficult to improve the cooling performance of the whole rectifier.

In addition, an electric potential is generated between the cooling fins. When conductive materials such as saline solution is packed between the cooling fins, there is a possibility of causing an electric short-circuit due to the mutually opposite polarities, which may result in stopping the generation. Hence, to avoid such problems, it is necessary to secure a predetermined-length gap between the mutually-polarity cooling fins. This encounters a limitation in shortening the axial size, thereby being difficult in producing a compact rectifier.

In contrast, when it is desired to give the same dissipation area to the respective high-side and low-side cooling fins, the cooling fin located at a downstream position in the cooling air flow hardly receives the cooling air, thus being deteriorated in its cooling performance.

SUMMARY OF THE INVENTION

The present invention has been made in consideration of the foregoing conventional situations and an object of the present invention is to provide a rectifier for vehicular alternating current generation (alternator), which can improve the cooling performance by enlarging the dissipation area and which can be mounted in a narrow space of the vehicular engine compartment.

To realize the above object, as one mode, the present invention provides a rectifier for an alternating current generator, comprising: a plurality of high-side rectifying elements; a plurality of low-side rectifying elements; a plurality of high-side cooling fins that hold the high-side rectifying elements; and a plurality of low-side cooling fins that hold the low-side rectifying elements. In this way, by disposing the plurality of high-side cooling fins and the plurality of low-side cooling fins, the degree of freedom for designing the cooling (radiating) area of the fins can be increased. Enlarging the cooling area results in improved cooling performance.

Preferably, the plurality of high-side cooling fins are disposed to be either apart from each other by a predetermined distance or partially overlapped or contracted with each other and the plurality of low-side cooling fins are disposed to be either apart from each other by a predetermined distance or partially overlapped or contacted with each other. Thus it is possible to shorten the distance between the homopolar cooling fins. In addition, the homopolar cooling fins are partially overlapped on one another with a distance therebetween, so that even if foreign matters are packed between the fins, electoral short circuit can be avoided, raising the reliability of the generator (alternator).

It is preferred that at least one of the high-side and low-side cooling fins has a plate-like body to which the high-side rectifying elements or the low-side rectifying elements are secured, wherein the at least one of the body of the high-side or the low-side cooling fins is substantially perpendicular to a flow of cooling air taken into the generator. Thus it is possible that the cooling air can directly impinge onto the rectifying elements, contributing to a more improved cooling performance.

By way of example, at least one of the high-side and low-side cooling fins has an auxiliary cooling fin having a surface which is substantially in parallel with the flow of the cooling air. This substantially parallel geometry is able to increase the cooling are of the fins. The cooling air can be flown along the surfaces of the fins. These two factors are also helpful for an effective transfer of the heat from the fins to the flowing air, enhancing the cooling performance.

At least one of the high-side and low-side cooling fins may have at least one opening formed therethrough to have the cooling air flown through the opening. This opening allows the cooling air to easily pass through from one fin to the next fin, whereby cooling fins located at downstream positions in the cooling are flow still have high cooling performance.

It is also preferred that, of the plurality of high-side cooling fins, at least one cooling fin is different in shape of a body thereof from the remaining cooling fin and, of the plurality of the low-side cooling fins, at least one cooling fin is different in shape of a body thereof from the remaining cooling fin. Hence, it is possible to dispose the cooling fins more densely in a limited disposal space for the rectifier in the generator. In addition, such different shapes make it easier to control the flow of the cooling air which impinges onto the cooling fins.

It is still preferred that, of the plurality of high-side cooling fins, a cooling fin located upstream in the flow of the cooling air is smaller in an area of the body receiving the cooling air than a cooling fin located downstream in the flow of the cooling air, while, of the plurality of low-side cooling airs, a cooling fin located upstream in the flow of the cooling air is smaller in an area of the body receiving the cooling air than a cooling fin located downstream in the flow of the cooling air. This allows the downstream-side cooling fins to still receive the cooling manner directly, improving the cooling performance.

Further, the stator can be provided with a plurality of sets of stator windings wound therearound, the stator windings each having an output line, and the plurality of low-side rectifying elements can be disposed to the low-side cooling fins and the plurality of high-side rectifying elements are disposed to the high-side cooling fins so as to form a plurality of groups of rectifying circuits connected to the output lines of the stator windings. Thus, this is able to make the whole rectifier compact in size, even when it is necessary to dispose many rectifying elements needed by a plurality of sets of stator windings.

As another mode, the present invention provides an rectifier for an alternating current generator, comprising: a rotor having a cooling fan and having a rotary shaft driving the rotor, the cooling fan causing a flow of cooling air; and a plurality of cooling fins arranged in a direction along the rotary shaft of the rotary, the cooling fins having a high-side cooling fin holding a plurality of high-side rectifying elements and a low-side cooling fin holding a plurality of low-side rectifying elements; wherein the high-side cooling fins are overlapped in the direction and the low-side cooling fins are overlapped in the direction, of each set of the high-side and low-side cooling fins, an upstream-side cooling fin located upstream in the cooling air flow is narrower in area to receive the flow of the cooling air than a downstream-side cooling fin located downstream in the cooling air flow, and of at least the high-side cooling fins, the rectifying elements mounted to the upstream-side cooling fin are smaller in number than the rectifying elements mounted to the downstream-side cooling fin. Thus, the downstream-side cooling fin is able to receive a more volume of cooling air. It is also possible to reduce the number of rectifying elements to be mounted to a smaller-area cooling fin. Thus, it is possible to the rectifying elements with balance among the cooling fins, improving the reliability of the rectifier.

The remaining advantageous effects can be shown or read in the embodiments which will be explained later.

BRIEF DESCRIPTIONS OF THE DRAWINGS

DETAILED DESCRIPTION OF THE PREFERRED EMBODIMENTS

With reference to the accompanying drawings, various embodiments of the present invention, which are reduced into practice as vehicular alternating current (AC) generators (hereinafter referred to as alternators) will now be described.

First Embodiment

Referring to FIGS. 1-5, an alternator according to a first embodiment of the present invention will now be described.

Figure 1:
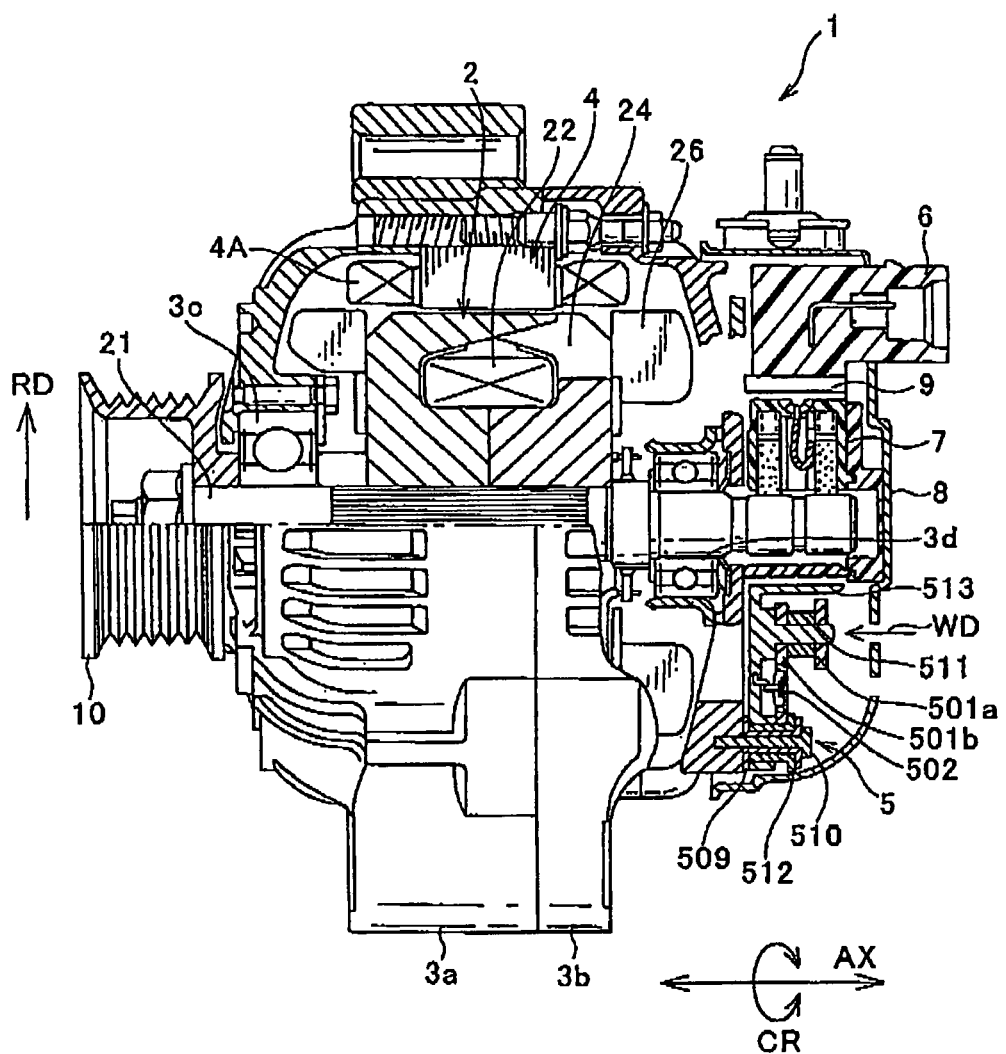
FIG. 1 is a partial sectional view outlining the configuration of a vehicular AC generator to which a rectifier according to a first embodiment of the present invention is applied.

FIG. 1 shows a sectional view of an alternator 1 according to the present embodiment. As shown therein, the alternator 1 is provided with a rotor 2, fixed secured on a rotary shaft 21, having a field coil 22 and magnetic poles 24, a stator 4 serving as an armature, and front and rear frames 3a and 3c. Hereinafter a direction along the rotary shaft 21 is referred to as an axial direction AX, a direction perpendicular to the axial direction is referred to as radial directions RD, and a direction around the rotary shaft 21 is referred to as a circumferential direction CR.

The rotary shaft 21, that is, the rotor 2, is driven to rotate by a force transmitted from an engine via a belt (not shown) and a pulley 10. The font and rear frames 3a and 3b are disposed to support both the rotor 2 and the stator 4 with the use of a pair of bearings 3c and 3d.

The alternator 1 is also provided with a rectifier 5, a brush unit 7, a regulator 9, a connector case 6, and a protective cover 8. Among these components, the rectifying unit 5 is electrically connected to the stator 4 to convert AC output to DC output. The brush unit 7 is disposed to support brushes which supplies a field current to the field coil 22 of the rotor 2. The regulator 9 controls the output voltage of this alternator. The connector case 6 comprises terminals to relay electronic signals to and from the vehicle. The protective cover 8, made of resin, is secured to the peripheral end portion of the rear frame 3b so as to enclose components including the rectifier 5, the regulator 9, and the brush unit 7.

The stator 4 is provided with a plurality of sets of stator windings 4A wound therearound, the stator windings 4A each having an output line, and, as will be describe later, a plurality of low-side (negative-side) rectifying elements are disposed at low-side cooling fins (radiating fins) and a plurality of high-side (positive-side) rectifying elements are disposed at high-side cooling fins (radiating fins) so as to form a plurality of groups of rectifying circuits connected to the output lines of the stator windings 4A.

In the present embodiment, the low-side and high-side rectifying elements mean rectifying elements connected to the higher potential side and lower potential side of the power source, respectively. The low-side and high-side cooling fins mean cooling fins disposed at the low-side and high-side rectifying elements, respectively.

The rotor 2 is also provided with cooling fans 26, which serves as a cooling mechanism to take in cooling air from the outside and allow the taken-in cooling air to flow via the rectifier 5. This cooling fans 26 are secured to the axial end faces of the rotor magnetic poles 24.

The rectifier 5 will now be detailed. The rectifier 5 comprises a first high-side cooling fin 501a, a second high-side cooling fin 501b, a first low-side cooling fin 503a, a second low-side cooling fin 503b, auxiliary fins 207 and 208, high-side rectifying elements 502, low-side rectifying elements 504, collar spacers 511, an insulator 512, bolts 510, a terminal base 513, and a pipe rivet 509.

In the present embodiment, the three high-side rectifying elements 502 and the three low-side rectifying elements are combined into one a set of three-phase full-wave rectifying circuit. The rectifier 5 has two three-phase full-wave rectifying circuits to rectify the output currents of the stator windings 4A.

The first and second high-side cooling fins 501a and 501b are overlapped in the axial direction AX, though both cooling fins 501a and 501b are spaced apart from each other in the axial direction AX. Each of the cooling fins 501a and 501b is a circular-arc plate-like body BD made of metal having heat dissipation characteristics. The second high-side cooling fin 501b is different in the body area from the first high-side cooling fin 501a.

Cooling air WD flows into the generator as shown in FIG. 1. The first high-side cooling fin 501a is located at an upstream position in the flow of the cooling air WD, compared to the second high-side cooling fin 501b. That is, this cooling fin 501b is located downstream of the first high-side cooling fin 501a. In the present embodiment, the first and second high-side cooling fins 501a and 501b are spaced apart by a predetermined length in the axial direction AX, but this is not a definitive example. Both cooling fins 501a and 501b are may be arranged in the axial direction AX with no gap therebetween, that is, in the condition where the cooling fins 501a and 501b are partially contacted to each other (not shown).

In the same way as the above, the first and second low-side cooling fins 503a and 503b are constructed. In other words, both cooling fins 503a and 503b are located in the two stage manner in the axial direction AX. In the flow of the cooling air WD, the first low-side cooling fin 503a is positioned upstream of the second low-side cooling fin 503b. Both cooling fins 503a and 503b are spaced apart by a predetermined length in the axial direction AX, but may be partially contacted to each other (not shown). The sizes and materials of both cooling fins 503a and 503b are the same as those of the foregoing cooling fins 501a and 501b.

The auxiliary fins 507, which are grouped, are secured to each of the first and second high-side cooling fins 501a and 501b so that the surfaces of the fins 507 are in parallel with the flow of the cooling air WD (i.e., the axial direction). Each group of the auxiliary fins 507 is located to extend from each rectifying element 502. The auxiliary fins 508, which are also grouped, are secured to each of the first and second low-side cooling fins 503a and 503b so that the surfaces of the fins 508 are in parallel with the flow of the cooling air WD. Each group of the auxiliary fins 508 is located to extend from each rectifying element 503.

Each of the first and second high-side cooling fins 501a and 501b has a plurality of air holes 505 which are opened therethrough. The cooling air WD is allowed to pass through the air holes 505. A plurality of mounting holes are also formed through each of the first and second high-side cooling fins 501a and 501b. Each of the high-side rectifying elements 502 is pressed into each mounting hole. Each of the first and second low-side cooling fins 503a and 503b has a plurality of air holes 506 which are opened therethrough. The cooling air WD is allowed to pass through the air holes 506. A plurality of mounting holes are also formed through each of the first and second low-side cooling fins 503a and 503b. Each of the high-side rectifying elements 504 is pressed into each mounting hole.

Each of the collar spacers 511 is used to electrically connect the homopolar cooling fins, that is, the first and second high-side cooling fins 501a and 501b, and the first and second low-side cooling fins 503a and 503b. Each collar spacer 511 is made of for example a metal material having higher heat conduction. The insulator 512 is a member that electrically isolates the first and second high-side cooling fins 501a and 501b and the rear frame 3b from each other.

The terminal base 513 fixedly supports the first and second high-side cooling fins 501a and 501b and the first and second low-side cooling fins 503a and 503b. The terminal base 513 is provided with wiring members for electrically connecting the high-side and low-side rectifying elements 502 and 504 and the windings of the stator 4. Such wiring members are insert-molded in the terminal base 513. The pipe rivet 509 is used to support the terminal base 513, the first and second high-side cooling fins 501a and 501b, and the insulator 512 so that these members are stacked on one another.

Each bolt 510 secures each fin to the rear frame 3b. In other words, the first and second high-side cooling fins 501a and 501b are secured by fastening the pipe rivet 509 to the rear frame 3b with the use of the bolt 510 in the state where the terminal base 513 and Insulator 512 are engaged with the pipe rivet 509. Meanwhile, the first and second low-side cooling fins 503a and 503b are secured to the rear frame 3b by the bolt 510 such that the cooling fins 503a and 503b are directly touched to the rear frame 3b.

Figure 2:
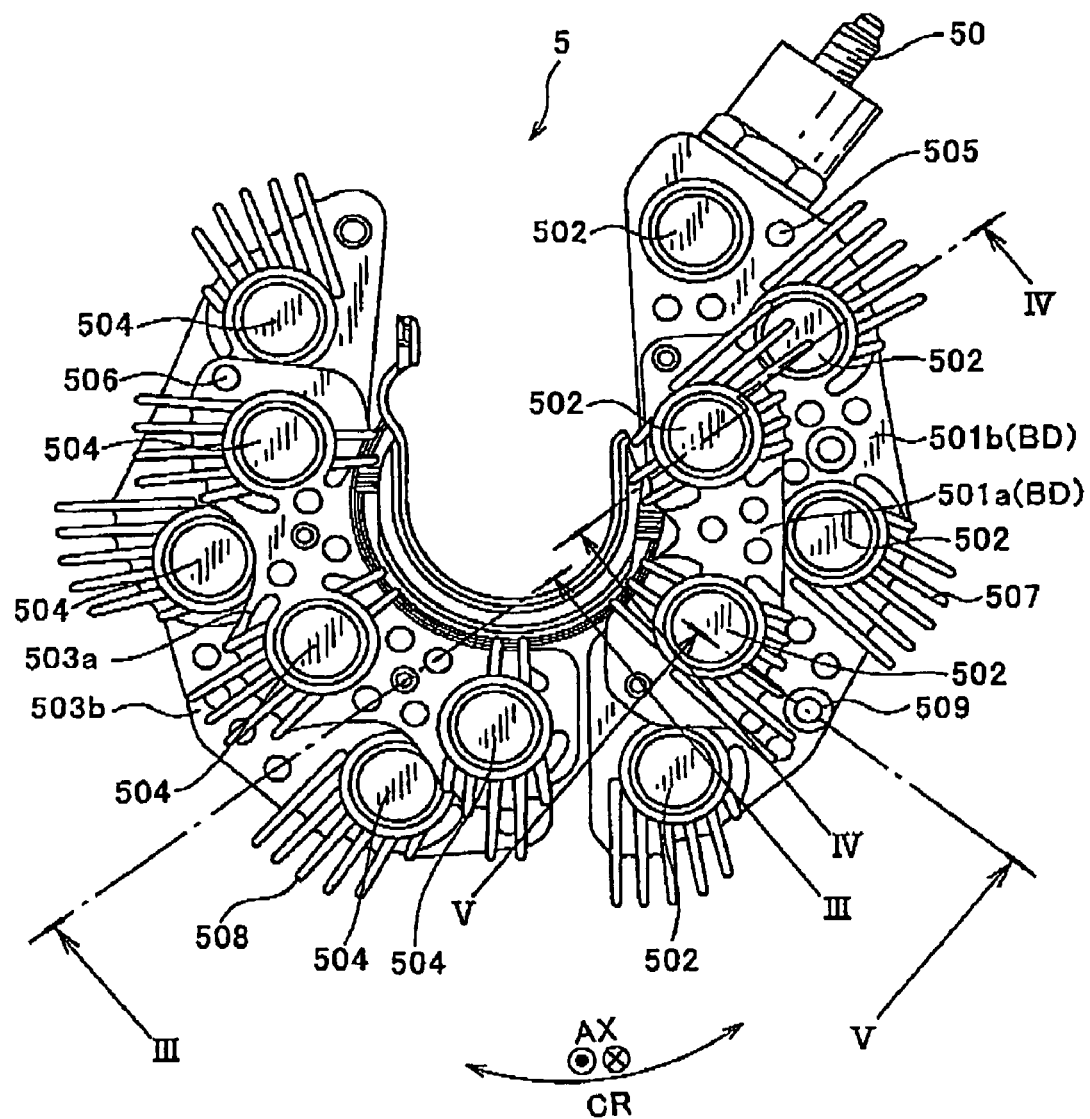
FIG. 2 is a front view showing the rectifier.
Figure 3:
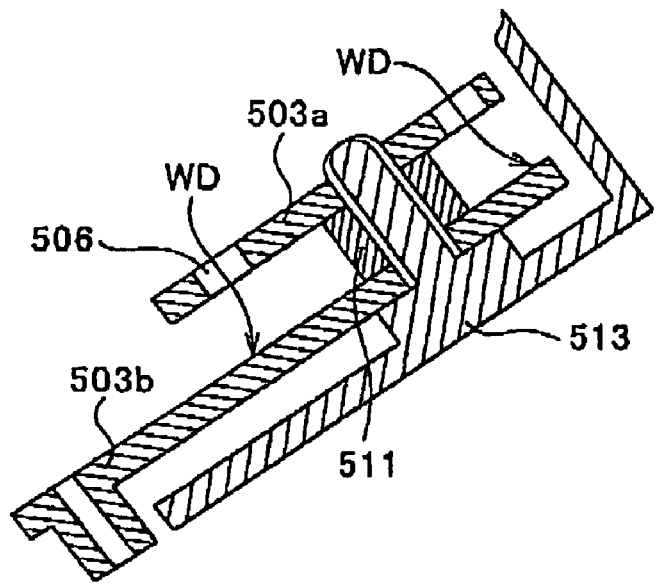
FIG. 3 is a partial sectional view taken along a III-III line shown in FIG. 2.
Figure 4:
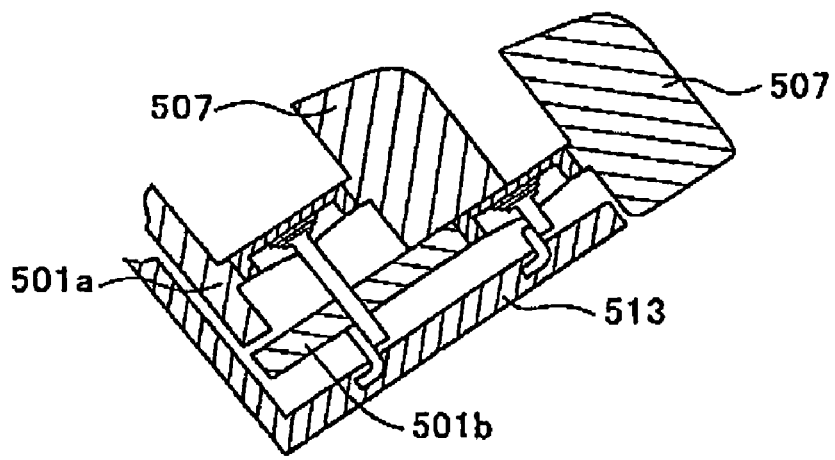
FIG. 4 is a partial sectional view taken along a IV-IV line shown in FIG. 2.
Figure 5:
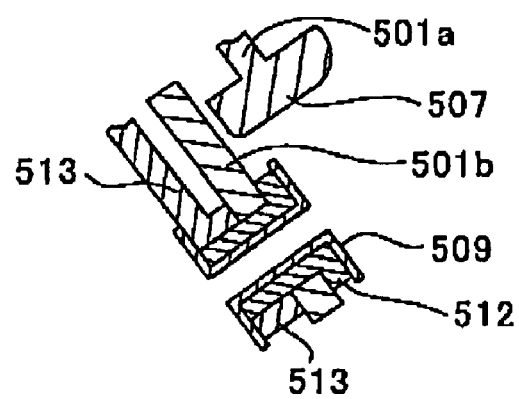
FIG. 5 is a partial sectional view taken along a V-V line shown in FIG. 2.

In the present embodiment, as shown in FIG. 2, the first and second high-side cooling fins 501a and 501b, which are overlapped in the axial direction, and the first and second low-side cooling fins 503a and 503b, which are also overlapped in the axial direction AX, are positioned to nearly surround the rotary shaft 21.

In this way, the cooling fins are disposed in the axial direction AX so that the homopolar cooling fins are overlapped in the axial direction AX, which results in space saving and obtaining the larger area for the heat dissipation. The air holes 505 are formed through the cooling fins 501a and 501b and the air holes 506 are formed through the cooling fins 503a and 503b, respectively. This allows the cooling air WD to flow along the auxiliary fins 507 and 508 in an effective manner, so that the heat can be transferred from these auxiliary fins 507 and 508 to the flowing air at a higher heat transfer rate. Further, the high-side cooling fins 501a and 501b and the low-side cooling fins 503a and 503b are mutually separated in the circumference direction of the rotary shaft 21. This prevents electrical short-circuit between the heteropolar cooling fins, improving reliability in the performance of the rectifier.

There can be provided modifications of the present embodiment. In the configuration shown in FIG. 2, the front high-side cooling fin 501a has the two high-side rectifying elements 502, while the rear high-side cooling fin 501b has the four high-side rectifying elements 502 and allows the output terminal 50 to be coupled with this cooling fin 501b. Hence, the number of rectifying elements secured to the high-side cooling fin 501a, of which area is smaller than the other cooling fin 501b, can be reduced, while the cooling fins 501b, which has more rectifying elements, is able to transfer its heat to vehicular harness via the output terminal 50. It is therefore possible to cool down all the rectifying elements 502 with a balanced manner between the cooling fins 501a and 501b. This also enhances the reliability of performance of the rectifier 5.

Furthermore, in the configuration shown in FIG. 2, the number of rectifying elements 504 mounted to the low-side cooling fin 503a is the same as that to the low-side cooling fin 503b. This can also be modified into the manner applied to the high-side. That is, by way of example, the number of rectifying elements mounted to the front low-side cooling fin 503a, which is smaller in the body area than the rear low-side cooling fin 503b, can be made smaller than those mounted to the rear low-side cooling fin 503b.

Second Embodiment

Referring to FIGS. 6-12, a second embodiment of the present invention will now be described.

In the second embodiment and subsequent embodiment, for the sake of simplified or omitted explanations, components which are identical or similar to those in the first embodiment are given the same reference numerals as those in the first embodiment.

Figure 6:
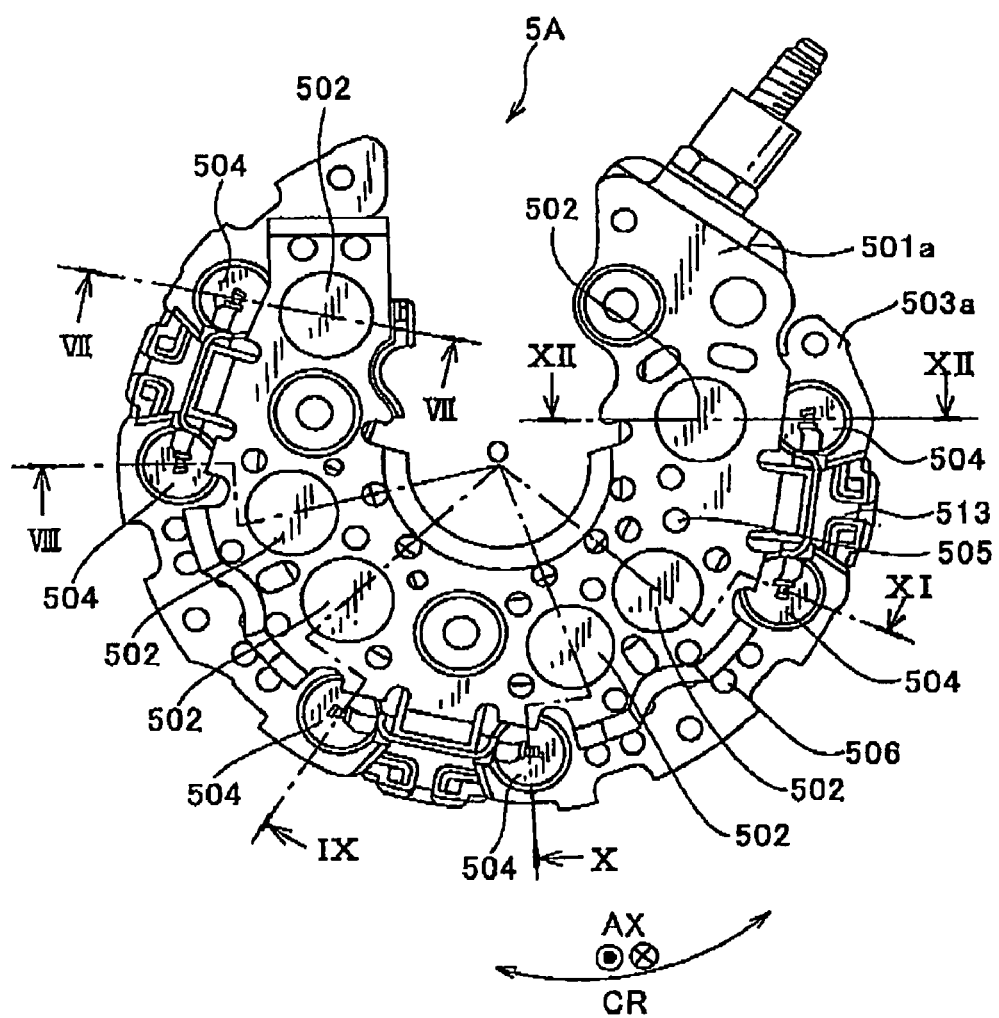
FIG. 6 is a front view showing a rectifier according to a second embodiment of the present invention.
Figure 7:
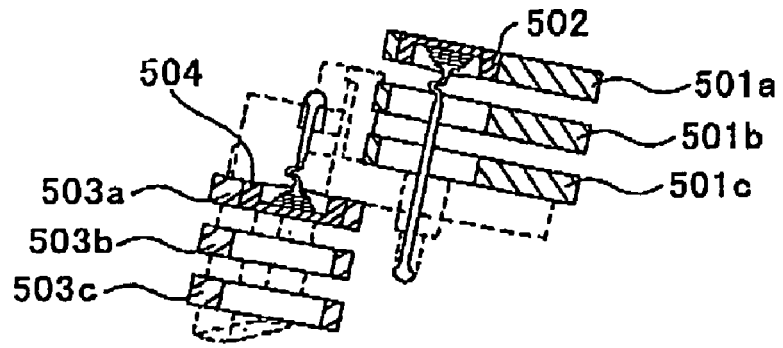
FIG. 7 is a partial sectional view taken along a VII-VII line shown in FIG. 6.
Figure 8:
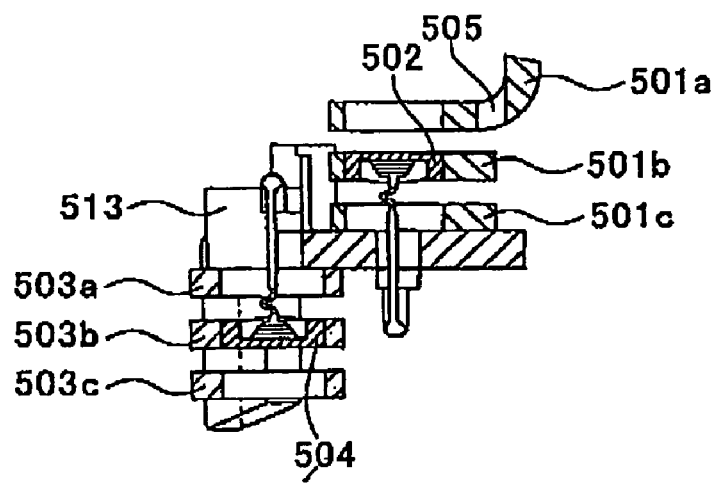
FIG. 8 is a partial sectional view taken along a VIII-O line shown in FIG. 6.
Figure 9:
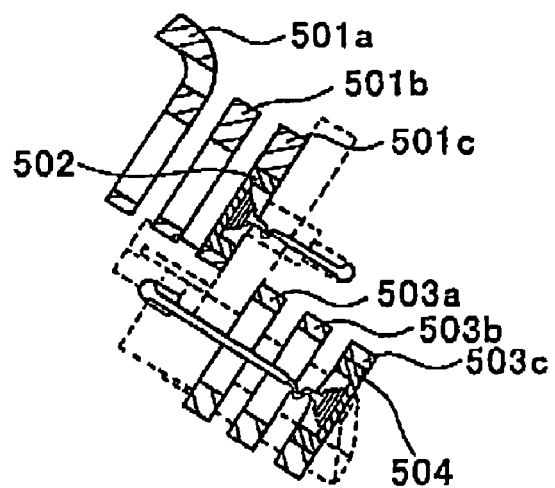
FIG. 9 is a partial sectional view taken along a IX-O line shown in FIG. 6.
Figure 10:
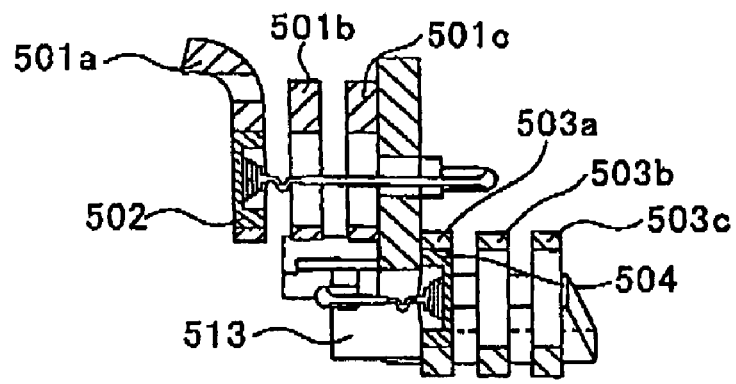
FIG. 10 is a partial sectional view taken along a X-O line shown in FIG. 6.
Figure 11:
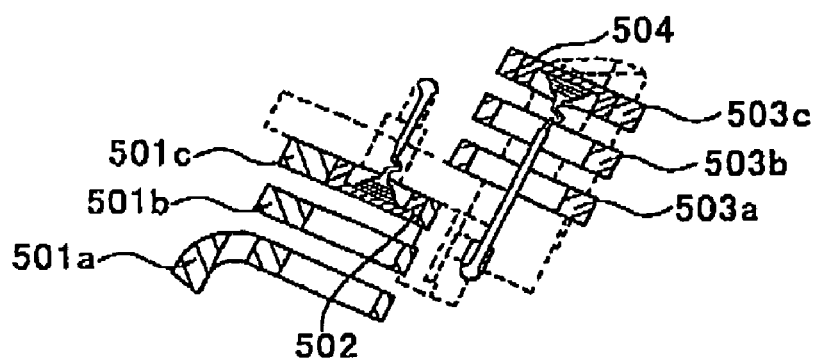
FIG. 11 is a partial sectional view taken along a XI-O line shown in FIG. 6.
Figure 12:
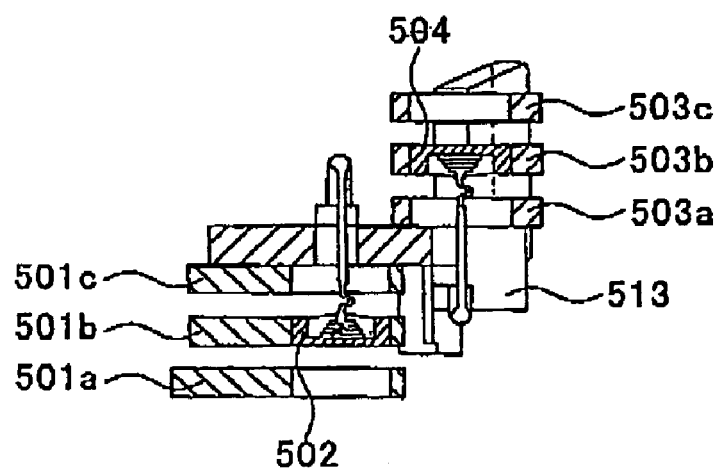
FIG. 12 is a partial sectional view taken along a XII-XII line shown in FIG. 6.

FIG. 6 shows a rectifier 5A adopted in the present embodiment. This rectifier 5A is mounted in the vehicular AC generator 1 shown in FIG. 1.

In this rectifier 5A, as shown in FIGS. 6-12, there are provided first, second, and third high-side cooling fins 501a, 501b and 501c and first, second, and third low-side cooling fins 503a, 503b and 503c.

As shown in FIGS. 7-12, from an upstream position in the flow of the cooling air WD to downstream positions therein, the first high-side cooling fin 501a, the second high-side cooling fin 501b, the third high-side cooling fin 501c, the first low-side cooling fin 503a, the second low-side cooling fin 503b, and the third low-side cooling fin 503c are located in this order. Specifically, the first to third pulse-side cooling fins 501a, 501b and 501c and the first to third low-side cooling fins 503a, 503b and 503c are disposed at six stages in the axial direction AX. In addition, in the radial direction RD, the first to third high-side cooling fins 501a, 501b and 501c are located closer to the rotary shaft 21 than the first to third low-side cooling fins 503a, 503b and 503c. And the high-side cooling fins 501a, 501b and 501c are shifted in positions in the radial direction RD from the low-side cooling fins 503a, 503b and 503c so that the cooling fins 501a, 501b and 501c hardly overlap with the cooling fins 503a, 503b and 503c in the radial direction RD. In the example shown in FIG. 6, the cooling fins 501a, 501b and 501c overlap, in part, with the cooling fins 503a, 503b and 503c in the radial direction RD, but may be completely separated from the cooling fins 503a, 503b and 503c by differentiating, set by set, the shapes or positions of the cooling fins.

A plurality of air holes 505 are formed through each of the first to third high-side cooling fins 501a, 501b and 501c. Similarly, a plurality of air holes 506 are formed through each of the first to third low-side cooling fins 503a, 503b and 503c.

In the present embodiment, the homopolar cooling fins, which are stacked on one another with a space left therebetween, are arranged to receive the flow of the cooling air WD. This results in saving the space and providing a larger dissipation area. By providing the air holes 505 or 506 to each cooling fin, all the cooling fins are able to well receive the cooling air WD, thus enabling the rectifier 5A to have higher cooling performance.

Third Embodiment

Figure 13:
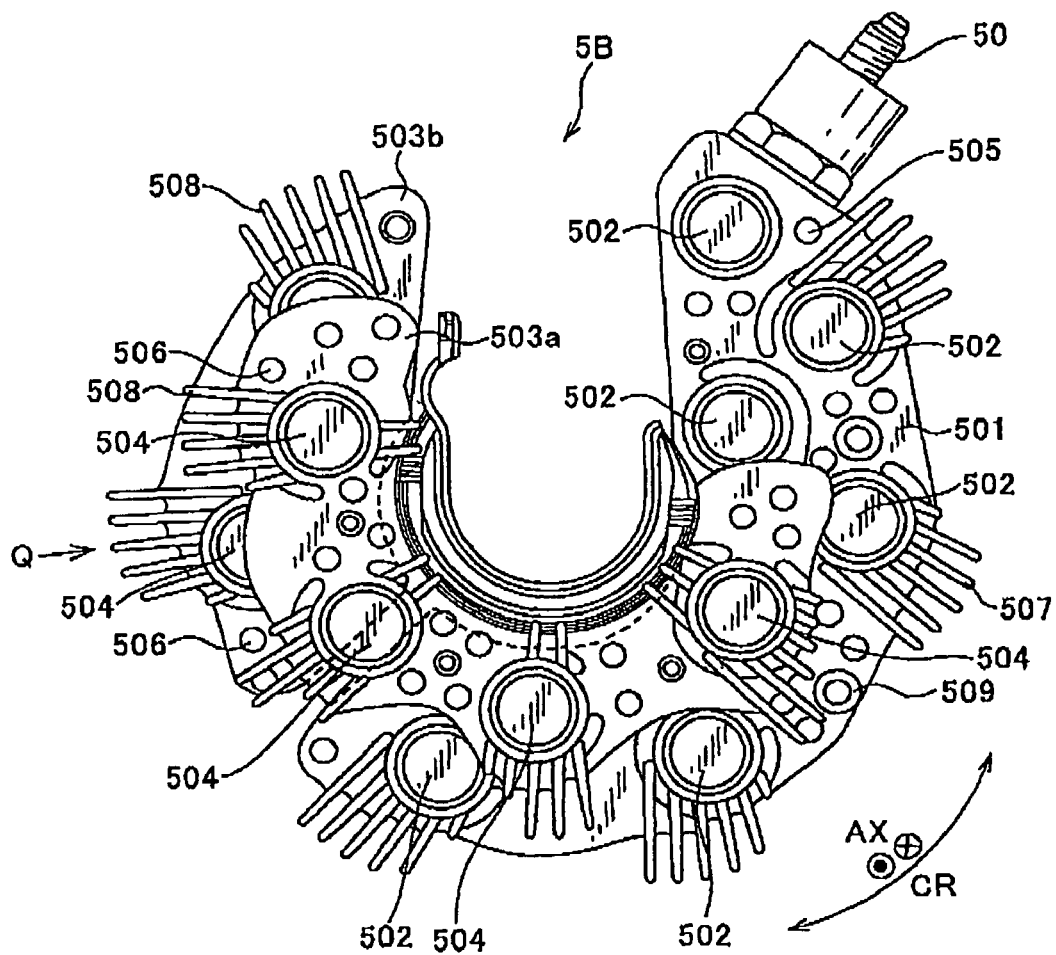
FIG. 13 is a front view showing a rectifier according to a third embodiment of the present invention.
Figure 14:
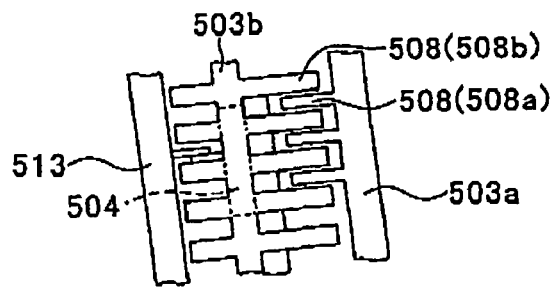
FIG. 14 is a partial side view taken along an arrow Q shown in FIG. 13.

Referring to FIGS. 13 and 14, a third embodiment of the present invention will now be described.

FIG. 13 shows the configuration of a rectifier 5B according to the present embodiment, which is also mounted in the vehicular AC generator 1 shown in FIG. 1.

As shown in FIGS. 13 and 14, the rectifier 5B comprises a high-side cooling fin 501, a first low-side cooling fin 503a, and a second low-side cooling fins 503b, in addition to the terminal base 513 and the output terminal 50.

Of the cooling fins, the first low-side cooling fin 503a is disposed at an upstream position in the flow of the cooling air WD, while both the second low-side cooling fin 503b and the high-side cooling fin 501 are disposed at downstream potions in the flow of the cooling air WD. In addition, the output terminal 50 is coupled with the high-side cooling fin 501.

The first low-side cooling fin 503a is disposed to have a predetermined distance from the second low-side cooling fin 503b in the axial direction AX. As a modification, the cooling fins 503a and 503b may be partially contacted to each other in the axial direction AX. In contrast, the high-side cooling fin 501 is disposed to have predetermined distances from the first and second low-side cooling fins 503a and 503b in the circumferential direction CR and the axial direction AX, respectively. Namely, the first low-side cooling fin 503a is disposed at a front-side position in the axial direction AX, and the high-side cooling fin 501 and the second low-side cooling fin 503a are disposed at the same rear-side position in the axial direction AX, so that these cooling fins 501, 503a and 503b are located in the second stage manner to surround the rotary shaft 21 in a circular-arc shape when viewed in the axial direction AX. The total front (and rear) area of the plate-like bodies of the first and second low-side cooling fins 503a and 503b is set to be larger than the front (and rear) area of the plate-like body of the high-side cooling fin 501.

The plurality of high-side rectifying elements 502 mounted to the high-side cooling fin 501 are higher in mounting density than the plurality of low-side rectifying elements 504 mounted to the first and second low-side cooling fins 503a and 503b.

Of the plurality of low-side cooling fins, at least one fin has the rectifying elements 504 whose number is different from the other cooling fins. At least one cooling fin has a different shape different from that of the other cooling fins. In addition, at least one set of the cooling fins has mutually opposing surfaces on which auxiliary cooling fins 508 are mounted.

Specifically, in the example shown in FIG. 13, the low-side cooling 503a and 503b fins are two in number. The first low-side cooling fin 503a, which is located at the front-side position, has four rectifying elements 504, while the second low-side cooling fin 503b, which is located at the rear-side position, has two rectifying elements 504. The plate-shaped body of the front-side (upstream-side) cooling fin 503a is different in shape from that of the rear-side (downstream-side) cooling fin 503b. Additionally, as shown in FIG. 14, on mutually opposing partial surfaces of the first and second low-side cooling fins 503a and 503b, auxiliary fins 508a and 508b are mounted.

In the present embodiment, the output terminal 50 is connected to the high-side cooling fin 501, the heat can be transferred to from this cooling fin 501 to the harness of the vehicle, still securing cooling performance. Because of this, the area of the plate-like body of the high-side coing fin 501, which receives the flow of the cooling air WD, can be made smaller, thus providing a vacant space. In this vacant space, the low-side cooling fins 503a and 503b can be arranged in a stacked manner, and, in total, can have a larger dissipation area. Moreover, the air holes 505 and 506 are formed through the respective cooling fins 501, 503a and 503b, whether the rectifier 5B has a higher performance.

Incidentally, the present invention will not be limited to the structures described above, and can still be modified into various other forms. In the first and second embodiments, the high-side and low-side cooling fins may be differentiated in number from each other.

In addition, in the foregoing respective embodiments, the surfaces of the plate-like bodies of all the cooling fins are almost perpendicular to the flow of the cooling air WD taken in by driving the cooling fans 26. But this is not a definitive list. The surfaces of one or more cooling fins, but not all the fins, may be perpendicular to the cooling air flow. Those surfaces may also be oblique to the cooling air flow. Of the high-side and low-side cooling fins, at least one cooling fin may have the air holes 505 (506), being not always necessary to give the air holes 505 and 506 to both high-side and low-side cooling fins.

In the foregoing first and third embodiments, at least one cooling fin may have auxiliary fins 507 (508).

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A rectifier for an alternating current generator, comprising:
   a plurality of high-side rectifying elements;
   a plurality of low-side rectifying elements;
   a plurality of high-side cooling fins that hold the high-side rectifying elements such that the high-side rectifying elements are seated on the high-side cooling fins; and
   a plurality of low-side cooling fins that hold the low-side rectifying elements such that the low-side rectifying elements are seated on the low-side cooling fins.

2. The rectifier according to claim 1, wherein the plurality of high-side cooling fins are disposed to be either apart from each other by a predetermined distance or partially overlapped or contracted with each other and the plurality of low-side cooling fins are disposed to be either apart from each other by a predetermined distance or partially overlapped or contacted with each other.

3. The rectifier according to claim 2, wherein at least one of the high-side and low-side cooling fins has a plate-shaped body to which the high-side rectifying elements or the low-side rectifying elements are secured, wherein the at least one of the body of the high-side or the low-side cooling fins is substantially perpendicular to a flow of cooling air taken into the generator.

4. The rectifier according to claim 3, wherein at least one of the high-side and low-side cooling fins has an auxiliary cooling fin having a surface which is directed substantially in parallel with the flow of the cooling air.

5. The rectifier according to claim 1, wherein at least one of the high-side and low-side cooling fins has at least one opening formed therethrough to have the cooling air flown through the opening.

6. The rectifier according to claim 1, wherein, of the plurality of high-side cooling fins, at least one cooling fin is different in shape of a body thereof from the remaining cooling fins and, of the plurality of the low-side cooling fins, at least one cooling fin is different in shape of a body thereof from the remaining cooling fins.

7. The rectifier according to claim 4, wherein the auxiliary cooling fin is composed of a plurality of cooling fins secured to the high-side cooling fins and the low-side cooling fins, respectively, the plurality of auxiliary cooling fins of the high-side cooling fins being directed respectively so as to cool the plurality of high-side rectifying elements and the plurality of auxiliary cooling fins of the low-side cooling fins being directed respectively so as to cool the plurality of low-side rectifying elements,
   wherein, of the auxiliary cooling fins secured to the high-side cooling fins, at least one auxiliary cooling fin is different in shape from the remaining auxiliary cooling fins and, of the auxiliary cooling fins secured to the low-side cooling fins, at least one auxiliary cooling fin is different in shape from the remaining auxiliary cooling fins.

8. The rectifier according to claim 6, wherein, of the plurality of high-side cooling fins, a cooling fin located upstream in the flow of the cooling air is smaller in a surface of the body receiving the cooling air than a cooling fin located downstream in the flow of the cooling air, while, of the plurality of low-side cooling fins, a cooling fin located upstream in the flow of the cooling air is smaller in a surface of the body receiving the cooling air than a cooling fin located downstream in the flow of the cooling air.

9. The rectifier according to claim 1, wherein the stator is provided with a plurality of sets of stator windings wound therearound, the stator windings each having an output line, and the plurality of low-side rectifying elements are secured on the low-side cooling fins and the plurality of high-side rectifying elements are secured on the high-side cooling fins so as to form a plurality of groups of rectifying circuits connected to the output lines of the stator windings.

10. A rectifier for an alternating current generator provided with a rotor having a cooling fan and having a rotary shaft driving the rotor, the cooling fan causing a flow of cooling air, comprising:
    a plurality of cooling fins arranged in a direction along the rotary shaft of the rotor, the cooling fins having a plurality of high-side cooling fins and a plurality of low-side cooling fins;
    a plurality of high-side rectifying elements seated on the high-side cooling fins; and
    a plurality of low-side rectifying elements seated on the low-side cooling fins,
    wherein the high-side cooling fins are overlapped in the direction and the low-side cooling fins are overlapped in the direction,
    of each set of the high-side and low-side cooling fins, an upstream-side cooling fin located upstream in the cooling air flow is narrower in area to receive the flow of the cooling air than a downstream-side cooling fin located downstream in the cooling air flow, and
    of at least the high-side cooling fins, the rectifying elements seated on the upstream-side cooling fin are smaller in number than the rectifying elements seated on the downstream-side cooling fin.

11. The rectifier according to claim 10, wherein the generator has an output terminal to output power generated therefrom and the output terminal is secured to the downstream-side cooling fin of the high-side cooling fins.

12. A rectifier for an alternating current generator having an output terminal to output power generated therefrom, comprising:
    a plurality of low-side rectifying elements;
    a plurality of high-side rectifying elements;
    a plurality of low-side cooling fins that hold the low-side rectifying elements such that the low-side rectifying elements are seated on the low-side cooling fins, the low-side cooling fins being overlapped on one another with a predetermined length left therebetween or with the fins partly contacted with each other and having surfaces to receive a flow of cooling air, the surfaces being directed to be substantially perpendicular to the flow of cooling air, a total area of the surfaces being larger than a surface area of the high-side cooling fin receiving the cooling air flow; and
    a high-side cooling fin that holds the high-side rectifying elements such that the high-side rectifying elements are seated on the high-side cooling fin, the high-side cooling fin being disposed to be apart from the low-side cooling fins and the output terminal being secured to the high-side cooling fins.

13. The rectifier according to claim 12, wherein the plurality of high-side rectifying elements seated on the high-side cooling fin are denser in mounting density than the plurality of low-side rectifying elements seated on the low-side cooling fins.

14. The rectifier according to claim 12, wherein at least one of the plurality of low-side cooling fins differs from the others of the plurality of low-side cooling fins in the number of low-side rectifying elements to be held.

15. The rectifier according to claim 12, wherein at least one set of the plurality of low-side cooling fins has mutually opposing surfaces on which auxiliary cooling fins are mounted.

16. The rectifier according to claim 12, wherein, of the plurality of low-side cooling fins and the high-side cooling fin, at least one cooling fin has a surface substantially perpendicular to a flow of cooling air taken in the generator, the surface being provided to which low-side or high-side rectifying elements are secured.

17. The rectifier according to claim 12, wherein, of the plurality of low-side cooling fins and the high-side cooling fin, at least one cooling fin has an auxiliary cooling fin formed to have a surface which is substantially in parallel with the flow of cooling air.

18. The rectifier according to claim 12, wherein at least one of the high-side and low-side cooling fins has at least one opening formed therethrough to have the cooling air flown through the opening.

19. The rectifier according to claim 12, wherein, of the plurality of the low-side cooling fins, at least one cooling fin is different in shape of a body thereof from the remaining cooling fins.

20. The rectifier according to claim 17, wherein the auxiliary cooling fin is composed of a plurality of cooling fins secured to the high-side cooling fins and low-side cooling fins, respectively, the plurality of auxiliary cooling fins of the high-side cooling fins being directed respectively so as to cool the plurality of high-side rectifying elements and the plurality of auxiliary cooling fins of the low-side cooling fins being directed respectively so as to cool the plurality of low-side rectifying elements, wherein, of the auxiliary cooling fins secured to the high-side cooling fin, at least one auxiliary cooling fin is different in a body shape from the remaining auxiliary cooling fins and, of the auxiliary cooling fins secured to the low-side cooling fins, at least one auxiliary cooling fin is different in a body shape from the remaining auxiliary cooling fins.

\* \* \* \* \*